July 27, 1954
W. BECKER
2,684,609
APPARATUS FOR COMPARING RADIATION ABSORPTION OF LIQUIDS
Filed April 4, 1951
3 Sheets-Sheet 2
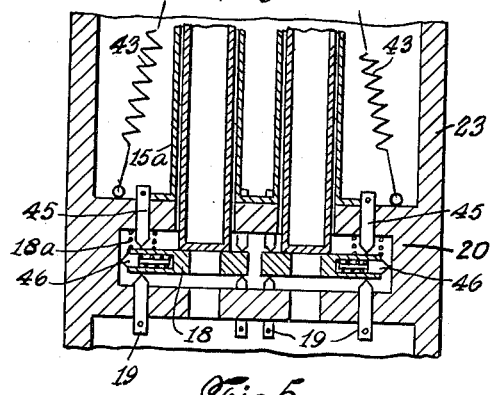
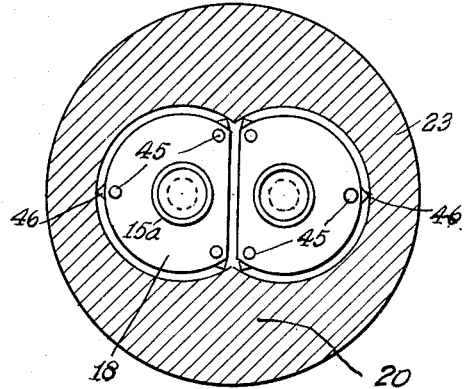
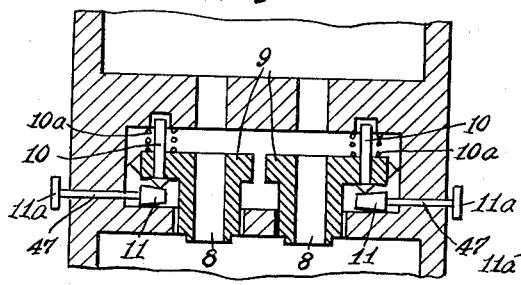
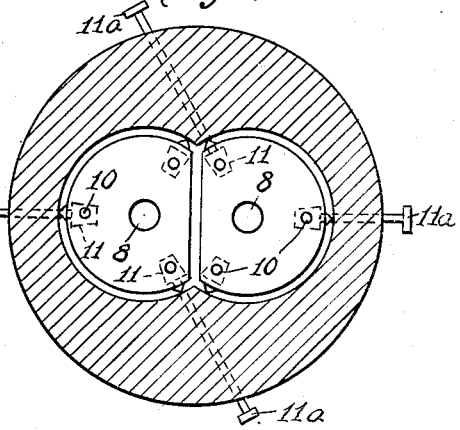
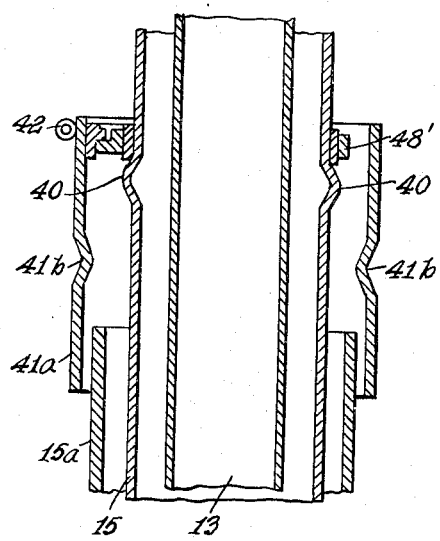
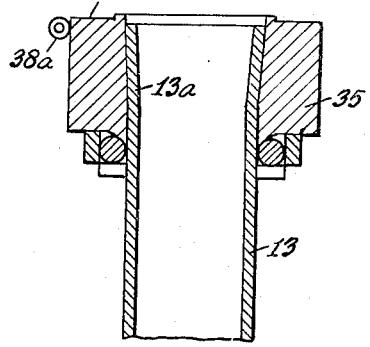
INVENTOR.
WALTER BECKER
BY
ATTORNEY

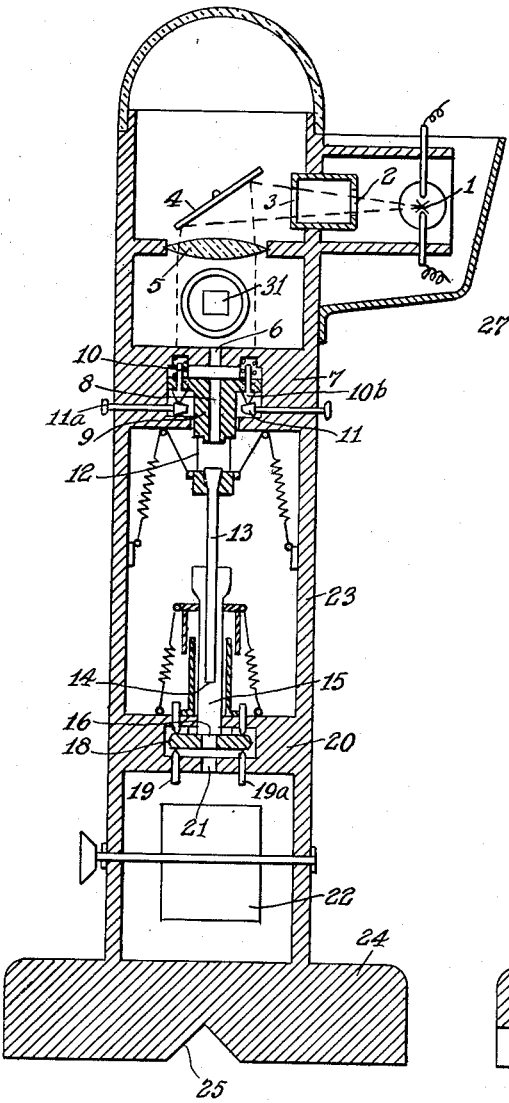

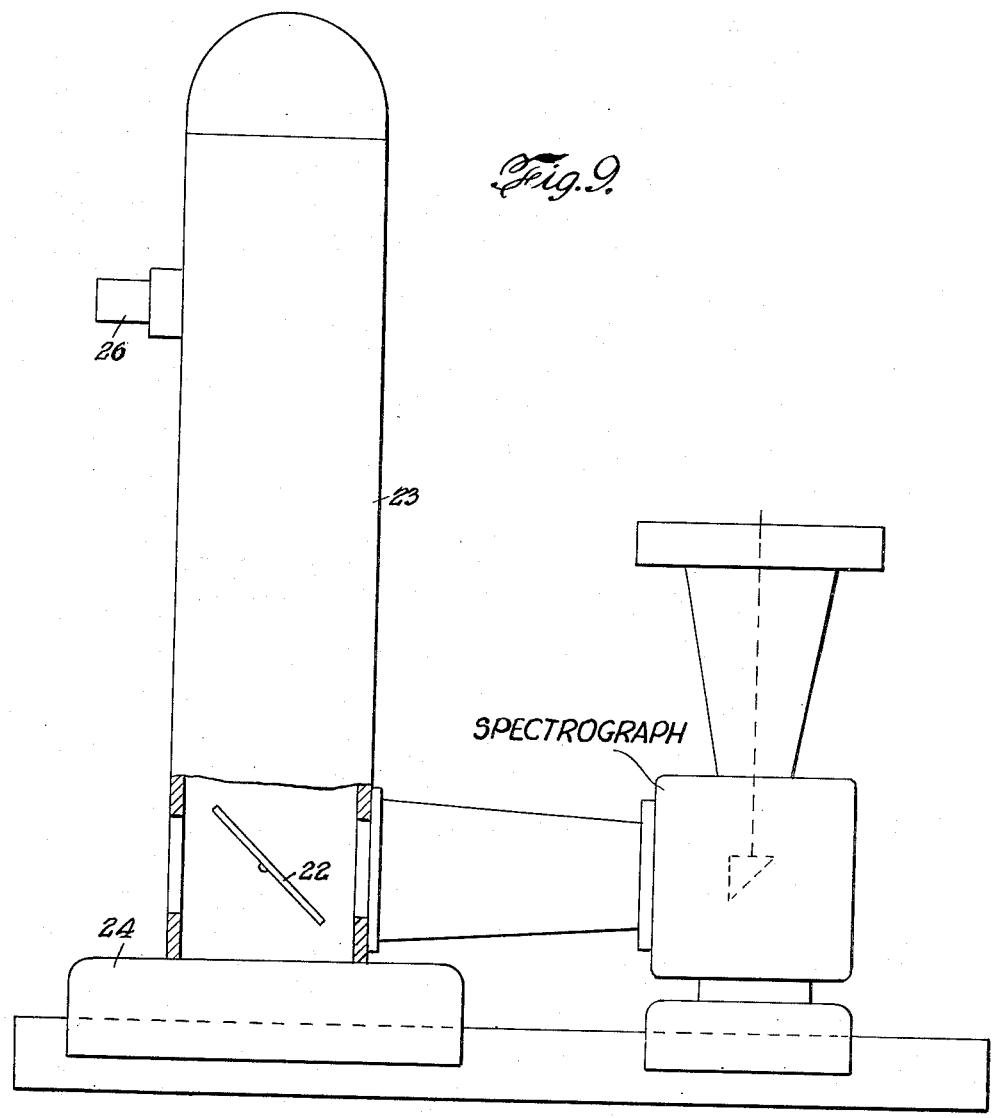

Patented July 27, 1954

2,684,609

UNITED STATES PATENT OFFICE 2,684,609

APPARATUS FOR COMPARING RADIATION ABSORPTION OF LIQUIDS

Walter Becker, Lindau, Germany, assignor to Theodore Becker, Wappingers Falls, N. Y.

Application April 4, 1951, Serial No. 219,184

2 Claims. (Cl. 88—14)

This invention relates to apparatus for the measurable comparison of the radiation absorption of liquids. Electromagnetic radiation, in particular light, is absorbed to a different degree by various substances. The light intensity $I_0$ of a preferably monochromatic pencil of rays traversing a liquid column of the length $d$ is reduced, after passing through this liquid column, to the value:

(1)
$$I = I_0 10^{-\frac{e}{l}cd}$$

in which $c$ represents the concentration of the liquid in gram-moles per liter, $e/l$ is a characteristic material constant dependent on the wave length of the radiation traversing the liquid and on the experiment temperature. When this constant $e/l$ and the length $d$ of the liquid column are known, it is possible to determine the concentration $c$ at the experiment temperature. On the other hand, when the concentration $c$ of the liquid is known, the determination of the molar extinction coefficient $e/l$ is possible.

It is an object of the present invention to establish a method of and suitable apparatus for the measurable comparison of the radiation absorption of liquids and the following represents a preferred means to this end.

Preferably a monochromatic radiation source, in concentrated form, is located in the focal point of an optical system, whereby a pencil of rays issuing therefrom is made parallel. By means of suitable shutters, two narrower beams of parallel rays are selected from the wider initial beam. Each of these narrower beams is caused to traverse a vat or trough filled with a solution or a solvent, the vat presenting two plane closing surfaces perpendicular to the axis of the impinging beam. After passage through the liquids, the two beams are united by a Hüfner rhombus in such a way that they touch in a sharp separating line on the frosted pane of an observation apparatus or in the slit plane of a spectrograph. In the path of this beam there is located a weakening device, for example a rotatable sector; through it the light intensity of this beam can be weakened to such an extent that the intensities of the two beams are equal, so that the sharp separating line disappears.

According to Equation 1, the radiation intensity after passage through the fluid and the weakening means, i. e. such as the rotatable sector, is (2)
$$I_1 = aI_e 10^{-kld}$$

The radiation intensity after passing through the fluid is, likewise according to Equation 1:

(3)
$$I_2 = I_e 10^{-\left(kl + \frac{e}{l}c\right)d}$$

Here $a$ is a measure of the weakening of one beam in relation to the other; $kl$ is the molar extinction coefficient of the fluid, liquid or solvent. Therefore, as soon as the sharp separating line between the two beams disappears in the observation apparatus, $I_1$ is equal to $I_2$ and there is obtained from the Equations 2 and 3 the equation:

(4)
$$\log a = -\frac{e}{l}cd$$

With the aid of Equation 4, if the molar extinction coefficient $e/l$ is known, the concentration $c$ can be determined, or conversely, if $c$ is known, the value of $e/l$ can be determined. It is clear that the accuracy of the result depends largely on how accurately the length $d$ of the radiated layer or column of liquid can be established.

Among the means hitherto known for the measurable comparison of the radiation absorption of liquids two essentially different methods must be distinguished.

In one system vats of a predetermined length are employed. The ends of the vats are closed by plane limiting discs either firmly cemented thereto or mechanically retained in place. It is difficult to fill and clean these vats and practically impossible to prevent the formation therein of bubbles. The necessity of using a large number of vats for each analysis complicates the work and leads to frequent breakage and inconvenience. A second system, essentially different from the first, preferably employs cylindrical troughs or tubes having a planar bottom window, into each of which there projects an immersion cylinder likewise having a planar bottom window. The immersion cylinder is vertically displaceable by mechanical means. In this system due to its vertical arrangement there is economy of space and the cylindrical vessels are more easily handled, cleaned, etc. However, the required accuracy is not obtainable because of the small range of variations of the column thickness $d$ of the liquid layer and the relatively large errors of the scale reading method employed.

In the present invention an important advantage is obtained by the means afforded for the measurable comparison of the radiation absorption, simultaneously or otherwise, of at least two liquid columns in vertical hollow-cylindrical vessels, each provided with a radiation-permeable, planar bottom plate, the upper planar limiting surface of the liquid column being formed by the planar bottom surface of the immersion cylinder which is radiation-permeable, the immersion cylinder being displaceable longitudinally and projecting into the liquid receiving vessel. In order that the two planar surfaces between which the liquid column is formed may be brought into exact parallel relationship suitable adjusting means are provided as will be hereinafter fully described. The side wall of the immersion cylinder or tube is preferably opaque or blackened to prevent light diffusion, the light ray passing through the tube bore and the planar end disc which forms the radiation-permeable tube bottom.

Among the objects of the present invention is the provision of means in a device for the measurable comparison of the radiation absorption of liquids for greatly increasing the accuracy with which the depth of the irradiated liquid column may be maintained. Other important objects and the advantages obtainable by means of the invention will be pointed out in the following specification read in conjunction with the drawings forming a part thereof and in which:

Figure 1 is a vertical, sectional central view of a complete apparatus representing a preferred embodiment of my invention.

Figure 2 is a side, central sectional view of Fig. 1.

Figure 3 is a detail view, in section, of a portion of my device showing the adjustable supporting means and liquid receiving containers.

Figure 4 is a plan view of a portion of Fig. 3.

Figure 5 is a side view in section showing a detail of the means for adjustably supporting the immersion cylinders.

Figure 6 is a top plan view of Fig. 5.

Figure 7 is a detail, in section, of a portion of the tube assembly.

Figure 8 is a detail, in section, of the upper portion of the immersion tube assembly.

Figure 9 is a side elevation of my instrument operatively associated with a spectrograph unit.

Referring to the drawings, 1 is a suitable source of light, the radiation from which is limited by the shutters 2 and 3 and impinges on mirror 4 from where it is deflected at an angle of 90 degrees and made parallel by the lens 5, which latter would be a quartz lens if ultraviolet light is radiated by source 1. From this beam of parallel light a weaker beam of parallel light is selected by causing some of the rays to pass through the opening 6 in the upper portion of the horizontal wall 7 and then through the bore 8 of the insert member 9. The insert member 9 has three pins rigidly secured therein and vertically positioned. The upper ends 10 thereof extend and support the springs 10a which tend to press the member 9 downwardly so that the cone-shaped heads 10b thereof rest on the tapered portion of the displaceable wedges 11 forming the inner end portion of the thumb-screws 11a screwed into the side wall portion of the instrument. By this means it will be seen that the axial alignment of the bore 8, with member 9 may be adjusted relative to the light ray axis. Below member 9 and in line with the bore 8 is a hollow-cylindrical or U-shaped element 12 which carries the immersion cylinder 13, the bottom end portion of which is closed by the disc 14. This cylinder or tube 13 enters the liquid-receiving vessel 15, which in turn is equipped with a bottom disc 16 which rests upon the upper surface of the member 18 which is adjustably supported for axial alignment by the adjusting screws 19 and 19a or other suitable means. A bore or shutter 21 in the lower portion of the partition 20 permits the ray to pass through and impinge on the mirror 22 and may be conveyed to a Hüfner rhombus, a spectrograph or other observation apparatus as indicated in Fig. 9. The entire apparatus is preferably housed in a suitable case 23 which preferably is so constructed as to afford access to the inner parts and to permit convenient adjustment of the several screws, of extremely fine pitch, controlling the positioning of necessary elements. The base or foot 24 of the housing is provided with a suitable groove 25 for mounting on an optical bench. In Fig. 1, only the liquid container 15 and the respective immersion cylinder 13 of one set is disclosed. In Fig. 2, in which the view is turned through 90 degrees relative to Fig. 1, both sets are shown. In this view is shown adjusting device 26 comprising a telescope having an eyepiece 27 and an objective 28, the telescope tube being closed at the rear by a plane mirror 29. In the optical axis, there are positioned cross-hairs and two semi-permeable 45 degree mirrors or prisms 30 and 31, which are adapted individually to be moved angularly about the points 32 and 33 out of the path of the light rays. It will be noted that a hollow-cylindrical end measure element 12 is retained against the bottom 34 of each of the insert pieces 9 and against each of the latter is the head piece 35 of each immersion cylinder, which likewise presents a planar surface. The application of the immersion cylinder to the end measure element and that of the end measure element against the insert piece is resiliently controlled by suitable pressure exerting means such as the cable transmission 37 guided over rolls 36 and loaded by spring 38 attached to the tension adjustment means 39 positioned within the housing. The liquid receiving vessels 15 are provided with a shoulder 40, see Fig. 7, which is engaged by a ring member 41 forming the upper part of a suitable tubular apron 41a and having eyes 42 secured near the top thereof to which one end of spring 43 is attached, the other end of the spring being attached to eye 44 in the partition 20. By this arrangement the plane bottom surface 16 of the liquid receiving vessel 15 is pressed against the plane bordering surface of partition or base plate 18 concentrically with the bore 17.

In Figures 3 and 4 the intermediate piece 20 is shown in section and in top view. The base plates 18 rest on the tips of the screws 19, preferably three to each plate. For retaining the base plates 18 in their relative positions a set of upper holding screws 45 may be employed, these screws being opposed by the adjusting screws 19 and between which the edge of the plates 18 are engaged under pressure of the springs 18a. By alternate tightening and loosening of the adjusting screws 19 and of the respective holding screws 45 it is possible to incline the plane surfaces of the base plates 18 relative to the horizontal plane. To prevent lateral displacement of the base plates 18 suitable spring loaded distance pins may be provided as indicated at 46.

Figures 5 and 6 show in more detail the insert pieces 9 in section and in top view. The wedges 11 against the surface of which the heads of studs 10 rest may be displaced longitudinally by means of the screw portion 47 forming a part thereof and by this means the plane surface 34 of parts 9 may be adjusted relative to the horizontal plane. Means similar to 46 in member 18 may be used in connection with part 9 to prevent lateral displacement of same. To prevent rotation of members 9, due to turning of the screws 47 the spring loaded pins, such as 46, may engage vertical grooves cut in the walls of the spaces in which parts 9 are housed. The cylinders 15a serve as shields for the liquid receiving vessels 15, the shoulder 41b formed about the tube 41a being retained against the upper open end of the tube 15a by the tension of the springs 43 connected at their upper ends to the eye 42. Preferably there are three, equally spaced eyes 42 to equalize the spring tension, the said eyes preferably being carried by the removable ring 41. In Fig. 8, the head portion 35 is shown enlarged. The immersion cylinder 13 is preferably provided with a flared or conical portion 13a fitted to a similarly reamed bore in the part 35. The tubular measure element 12 rests on the plane surface 50 as shown in Figs. 1 and 2. The eyes 38a, only one of the three being shown, serve as anchors for the springs 38 previously referred to.

Among the important improvements and advantages of this invention is the employment of the end measures, whereby indirectly the length of the irradiated liquid column can be maintained with an accuracy of more than 1/100 mm. The well known merits of an immersion body system including space economy and a minimum requirement of analysis liquid increase the novelty and usefulness of the subject device. The instrument is simple to operate and quick determinations can be arrived at with great accuracy, and, as the precision parts are limited in number, as is also the plane ground surfaces, there is limited chance for breakage and the parts are easily handled, filled, cleaned, etc. Due to the unique principle of making necessary adjustments the plane surfaces of the immersion cylinders and the liquid receiving vessels are readily made parallel with each other. If in the course of prolonged use the apparatus should get out of adjustment, that is, the parallelism of the closing surfaces of the liquid columns should change and the length measure thus become inaccurate, the error can be quickly detected and verified by simply turning the 45 degree mirrors or prisms 30 and 31 into the main ray path whereupon the error may be quickly corrected and eliminated by manipulating the adjusting screws and wedges. The possibility of control and readjustment during a measurement series constitutes a special advantage of the invention. By equipping the system with suitable thermal control means it is possible to carry on a series of tests regardless of changing ambient temperatures. While not shown in detail, it is desirable to guide the central member 7, in at least three, preferably vertical grooves formed in the side wall of the housing 23. The cooperating guide elements carried by the member 7, suitably terminate downwardly in tips which rest for example on a step for each of a corresponding stair-shaped cavity in a metal ring carried by the housing. This ring in turn is mounted on at least three points, preferably adjustable in relation to the said housing 23, in such a way that the plane surface 34 of each insert piece will stand perfectly vertical on the optical axis of the instrument. The step heights in the ring may be suitably proportioned in such a way that they alone, or in connection with end measures 12 to be additionally inserted, determine the length of the liquid column. In the first case it is possible by mechanically caused, unidirectional rotation of the ring to adjust the next following liquid column length of the measurement series thus excluding double observations. This rotation may also be brought about by a drive mechanism, which in addition may carry out automatically also all other required operations and movements at the spectrograph, as for example plate conveyance after previous closing of the shutters, etc. Additionally to each group of steps having a finite number of steps there will preferably be provided also a corresponding one with infinitely many but infinitely narrow steps for survey observations. With this construction, the intermediate piece 20 may for purposes of utility be provided as rigidly anchored in the housing 23. It will be seen that it is hardly less appropriate to secure the central piece and properly to guide and to mount the intermediate piece 20, as described above for the central piece 7. All previously described possibilities and modifications exist within the scope of the inventive idea herein disclosed.

The special advantages and objects of the invention may be further summarized as follows:

The end measurements alone, whether they are pairs of single pieces or end measurement sequences combined to form at least three groups, for example in an annular detent body, determine the length of the liquid columns and the parallelism of the limiting surfaces of the liquid columns. This insures maximum accuracy of experiment. This advantage is combined with the known merits of an immersion body system, such as space economy and minimum requirement of analysis liquid. In addition to the possible automatic operation, which enables the practical execution of an entire measurement series without the use of trained labor, there is a low input of work for cleaning the vessels and a low breakage risk, since the immersion bodies as well as the liquid receiving vessels represent the only precision parts with a limited number of plane ground surfaces. With the maintenance of the necessary parallelism insured by the precision of the mechanical guide, for example the intermediate piece, then only one detent body or end measurement group will be required. Then will be afforded a rectangular horizontal section, setting the latter displaceably on a true reference surface.

Having illustrated and described a preferred embodiment of my invention I desire it to be understood that in carrying out the principle of my inventive idea structural changes and modifications may be resorted to without departing from the spirit of the invention as set forth in the following claims.

I claim:

1. Apparatus for comparing radiation absorption of at least two separate columns of liquid, including a vertically disposed hollow cylindrical vessel for each column of liquid having a substantially flat ray-permeable bottom plate, a vertical cylindrical immersion tube extending a variable distance adjustably down into each hollow cylindrical vessel from a distance above the latter and having a substantially flat second ray-permeable bottom plate, means for projecting a light ray axially through each hollow cylindrical vessel and the immersion tube associated therewith, a vertically movable member for each immersion tube supported in one portion of the apparatus, resilient means urging the immersion tube associated with each movable member towards said movable member whereby movement of said movable member will effect concomitant movement of said associated immersion tube, and whereby adjustment of each immersion tube in its axial direction is lightened, and externally accessible adjusting means transversely movable with respect to the axis of each vessel and tube, said adjusting means comprising a plurality of horizontally movable members having wedge portions on the inner ends thereof for suporting the movable members associated with the immersion tubes in variable elevation, whereby to vary the effective length of each column of liquid between the bottom plates of the vessels and tubes in the direction of said axis.

2. Apparatus according to claim 1, wherein the immersion tubes are coated upon the sides thereof with opaque material to prevent interference with the rays passing axially through the liquid columns for testing purposes.

References Cited in the file of this patent

UNITED STATES PATENTS

| Number | Name | Date |
|---|---|---|
| 1,976,636 | Roux | Oct. 9, 1934 |
| 2,436,511 | Flatford et al. | Feb. 24, 1948 |
| 2,563,702 | Benford | Aug. 7, 1951 |

FOREIGN PATENTS

| Number | Country | Date |
|---|---|---|
| 280,552 | Great Britain | Jan. 26, 1928 |